US009326336B2

(12) United States Patent
Knoedgen et al.

(10) Patent No.: US 9,326,336 B2
(45) Date of Patent: Apr. 26, 2016

(54) DUAL SWITCHER FLYBACK STRUCTURE FOR LED DRIVER

(71) Applicant: Dialog Semiconductor (UK) Ltd, Reading (GB)

(72) Inventors: Horst Knoedgen, Munich (DE); Julian Tyrrell, Swindon (GB)

(73) Assignee: Dialog Semiconductor (UK) Limited, Reading (GB)

( * ) Notice: Subject to any disclaimer, the term of this patent is extended or adjusted under 35 U.S.C. 154(b) by 0 days.

(21) Appl. No.: 14/550,919

(22) Filed: Nov. 22, 2014

(65) Prior Publication Data

US 2015/0230300 A1    Aug. 13, 2015

(30) Foreign Application Priority Data

Feb. 12, 2014    (EP) .................................... 14154877

(51) Int. Cl.
| | |
|---|---|
| *H05B 39/04* | (2006.01) |
| *H05B 33/08* | (2006.01) |
| *H02M 3/335* | (2006.01) |
| *H02M 1/096* | (2006.01) |

(52) U.S. Cl.
CPC ........... *H05B 33/0815* (2013.01); *H02M 1/096* (2013.01); *H02M 3/33507* (2013.01); *Y02B 20/346* (2013.01)

(58) Field of Classification Search
CPC ........... H05B 33/0815; H05B 33/0818; H05B 37/029; H05B 37/02; H05B 41/3925; H05B 41/391; H05B 41/2828; H05B 33/0803
USPC .............. 315/291, 294, 224, 307, 209 R, 219
See application file for complete search history.

(56) References Cited

U.S. PATENT DOCUMENTS

| | | | | |
|---|---|---|---|---|
| 2006/0077697 | A1* | 4/2006 | Yang | H02M 3/33507 363/21.13 |
| 2007/0164720 | A1* | 7/2007 | Lalithambika | H02M 3/33507 323/288 |
| 2010/0295470 | A1* | 11/2010 | Koutensky | H05B 33/0815 315/294 |
| 2010/0320934 | A1* | 12/2010 | Liu | H02M 1/4258 315/294 |
| 2011/0227506 | A1* | 9/2011 | Ren | H02M 3/33507 315/307 |
| 2012/0169245 | A1* | 7/2012 | Chen | H05B 33/0815 315/223 |

(Continued)

FOREIGN PATENT DOCUMENTS

EP    14154877.6-1802    8/2014

*Primary Examiner* — Douglas W Owens
*Assistant Examiner* — Syed M Kaiser
(74) *Attorney, Agent, or Firm* — Saile Ackerman LLC; Stephen B. Ackerman

(57) ABSTRACT

Driver circuits to reduce or remove flicker of SSL devices are presented. A controller for a power converter which converts electrical power at an input voltage into electrical power at an output voltage is described. The controller is configured to determine whether the input voltage is greater or smaller than a pre-determined voltage threshold; to operate a first switcher stage to transfer electrical power from the input of the power converter to the output of the power converter, during a first time period when the input voltage is greater than the pre-determined voltage threshold; and to operate a second switcher stage to transfer electrical power from the reservoir capacitor to the output of the power converter, during a second time period when the input voltage is smaller than the pre-determined voltage threshold.

18 Claims, 6 Drawing Sheets

(56) References Cited

U.S. PATENT DOCUMENTS

| | | | | |
|---|---|---|---|---|
| 2012/0194091 A1* | 8/2012 | Darshan | H05B 33/0845 | 315/209 R |
| 2012/0286684 A1* | 11/2012 | Melanson | H02M 1/4225 | 315/224 |
| 2013/0169182 A1* | 7/2013 | Park | H02M 3/33507 | 315/219 |
| 2013/0249437 A1* | 9/2013 | Wang | H05B 33/0815 | 315/307 |
| 2014/0022829 A1* | 1/2014 | Shi | H02M 1/4258 | 363/84 |
| 2014/0361701 A1* | 12/2014 | Siessegger | H05B 33/0803 | 315/200 R |
| 2015/0035450 A1* | 2/2015 | Werner | H05B 33/0815 | 315/291 |

* cited by examiner

DUAL SWITCHER FLYBACK STRUCTURE FOR LED DRIVER

TECHNICAL FIELD

The present document relates to driver circuits for light solid state lighting (SSL) devices. In particular, the present document relates to driver circuits which are configured to reduce or remove flicker of SSL devices.

BACKGROUND

Solid State Lighting (SSL) light bulb assemblies, e.g. Light Emitting Diode (LED) based light bulb assemblies, are expected to replace GLS (General Lighting Service) or incandescent lamps. SSL devices typically comprise a driver circuit and/or power converter in order to convert electric power from a line voltage supply to electric power suitable for an SSL light source comprised within the SSL device (e.g. an array of LEDs).

The driver circuit for an SSL device should be configured to convert the AC line voltage into the possibly constant load voltage and the possibly constant load current. In particular, the driver circuitry should be configured to control the load voltage and the load current such that the SSL device does not flicker in a manner which is visible to the human eye. Such a visible flicker may occur at a frequency of 100 Hz (for an alternating line voltage at a frequency of 50 Hz) or at a frequency of 120 Hz (for an alternating line voltage at a frequency of 60 Hz). Such flicker may be due to the sinusoidal waveform of the alternating line voltage which falls below the required minimum on-voltage $V_{on}$ of the SSL device within each half-wave of the sinusoidal line voltage. As a result, the SSL device is switched off at a frequency of 100/120 Hz, thereby creating an annoying flicker effect of the light source (i.e. of the SSL device).

SUMMARY

The present document addresses the above mentioned technical problem of SSL devices and describes an efficient method and system for driving a SSL device without a visible flicker. According to an aspect, a controller for controlling a power converter to convert electrical power at an input voltage into electrical power at an output voltage is described. The input voltage may be varying. In particular, the input voltage may be derived from a rectified version of an AC (alternating current) line voltage. The input voltage may vary in accordance to a cycle frequency (which may be twice the frequency of the line voltage). On the other hand, the output voltage may be substantially constant. In particular, the output voltage may correspond to an on-voltage of an SSL device which is to be provided with electrical power. As such, the controller may be configured to operate the power converter (notably a first and a second switcher stage of the power converter) such that a variation (or a degree of variation) of the output voltage is lower than a variation (or a degree of variation) of the input voltage.

The power converter comprises a first switcher stage comprising a primary winding of a transformer which is arranged in series with a first power switch. The first switcher stage may be arranged in parallel to the input voltage at an input of the power converter. Furthermore, the power converter comprises a secondary winding of the transformer which is arranged in parallel to the output voltage at an output of the power converter. As such, the first switcher stage and the secondary winding may form a first flyback power converter, which is configured to convert electrical power at the input voltage, provided at the input of the power converter, into electrical power at the output voltage, provided at the output of the power converter.

The power converter comprises a second switcher stage comprising an auxiliary winding of the transformer, which is arranged in series with a second power switch. The second switcher stage may be arranged in parallel to a reservoir capacitor. As such, the second switcher stage and the secondary winding may form a second flyback power converter, which is configured to convert electrical power, provided by the reservoir capacitor, into electrical power at the output voltage, provided at the output of the power converter.

The use of a power converter comprising a first and a second switcher stage is beneficial, as it allow for the provision of a substantially constant output voltage, even subject to significant variations of the input voltage. Furthermore, the reservoir capacitor may be operated at relatively low voltages (depending on the turns ratio of the transformer), thereby allowing the use of cost efficient capacitors with a relatively long life time.

The controller is configured to determine whether the input voltage is greater or smaller than a pre-determined voltage threshold. The pre-determined voltage threshold may be dependent on the level of the output voltage, which is to be generated. Furthermore, the pre-determined voltage threshold may be dependent on a conversion ratio (between the input voltage and the output voltage) which may be achieved by the power converter.

Furthermore, the controller is configured to operate the first switcher stage to transfer electrical power from the input of the power converter to the output of the power converter, during a first time period when the input voltage is greater than the pre-determined voltage threshold. An input voltage which is greater than the pre-determined voltage threshold may be an indication for the fact that the first flyback converter which is formed by the first switcher stage and by the secondary winding of the transformer is capable of providing the electrical power at a particular target level (e.g. at the on-voltage of an SSL device). Hence, the controller may operate the first switcher stage for providing the electrical power at the output voltage (e.g. at the on-voltage of an SSL device).

In addition, the controller is configured to operate the second switcher stage to transfer electrical power from the reservoir capacitor to the output of the power converter, during a second time period when the input voltage is smaller than the pre-determined voltage threshold. An input voltage which is smaller than the pre-determined voltage threshold may be an indication for the fact that the first flyback converter which is formed by the first switcher stage and by the secondary winding of the transformer is not capable of providing the electrical power at the particular target level (e.g. at the on-voltage of an SSL device). Hence, the controller may operate the second switcher stage for providing the electrical power at the output voltage (e.g. at the on-voltage of an SSL device) from the reservoir capacitor.

Consequently, the controller may be configured to operate the power converter such that for relatively high input voltages, the first switcher stage is used to draw energy from the input of the power converter, and such that for relatively low input voltages, the second switcher stage is used to draw energy from the reservoir capacitor. By doing this, electrical power at a substantially constant output voltage may be provided at the output of the power converter, even in the case of relatively strong variations of the input voltage.

The controller may be configured to commutate the first power switch between an on-state and an off-state during the first time period, for operating the first switcher stage. The first power switch may be operated at a commutation cycle rate and/or with a particular duty cycle. By doing this, the conversion ratio of the first flyback converter comprising the first switcher stage may be modified, such that a substantially constant output voltage is provided at the output of the power converter during the first time period.

In a similar manner, the controller may be configured to commutate the second power switch between an on-state and an off-state during the second time period. The second power switch may be operated at a commutation cycle rate and/or with a particular duty cycle. By doing this, the conversion ratio of the second flyback converter comprising the second switcher stage may be modified, such that a substantially constant output voltage is provided at the output of the power converter during the second time period.

The first and the second time period may alternate, e.g. at the cycle frequency.

Furthermore, the controller may be configured to operate the power converter such that either the first switcher stage or the second switcher stage is operated (in a mutually exclusive manner). In particular, the controller may be configured to maintain the first power switch in off-state during the second time period, and/or to maintain the second power switch in off-state during the first time period.

The controller may be further configured to operate the first and/or second switcher stages such that during the first time period electrical power is transferred from the input of the power converter to the reservoir capacitor. For this purpose, a bulk diode of the second power switch (and/or a dedicated diode) may be used to enable a charging current within the auxiliary winding of the transformer during the first time period for charging the reservoir capacitor. Furthermore, the second switcher stage may be configured such that the reservoir capacitor cannot be discharged via the auxiliary winding during the first time period (e.g. when the second power switch is in off-state).

According to a further aspect, a driver circuit configured to convert electrical power at an input voltage into electrical power at an output voltage is described. In particular, the driver circuit may be configured to convert a varying input voltage into a substantially constant output voltage for a solid state lighting, referred to as SSL, device. The substantially constant output voltage may correspond to an on-voltage of the SSL device.

The driver circuit comprises a first switcher stage comprising a primary winding of a transformer which is arranged in series with a first power switch. The first switcher stage may be arranged in parallel to the input voltage at an input of the driver circuit. Furthermore, the driver circuit comprises a second switcher stage comprising an auxiliary winding of the transformer which is arranged in series with a second power switch. The second switcher stage is arranged in parallel to a reservoir capacitor. In addition, the driver circuit comprises a secondary winding of the transformer which is arranged in parallel to the output voltage at an output of the driver circuit. The primary, secondary and auxiliary windings of the transformer are magnetically coupled with one another. In addition, the driver circuit comprises a controller as described in the present document.

The reservoir capacitor may be coupled to a supply voltage pin of the controller for supplying the controller with electrical power. In other words, a supply voltage capacitor of the controller may be used as a reservoir capacitor for storing energy during the first time period and for providing energy during the second time period (as outlined above). By doing this, the second switcher stage may be implemented in a cost-efficient manner.

As already indicated above, the input voltage may be derived from an AC line voltage. In particular, the driver circuit may comprise a rectifying unit configured to rectify the AC line voltage for providing the input voltage.

The driver circuit may further comprise decoupling means configured to decouple the first switcher stage from the input of the driver circuit during the second time period. By doing this, it may be ensured that the energy which is drawn from the reservoir capacitor during the second time period is not fed back towards the input of the driver circuit.

The driver circuit may comprise voltage sensing means (e.g. a voltage divider) configured to provide an indication of the input voltage to a voltage sensing pin of the controller. The controller may use this indication of the input voltage in order to determine whether the input voltage is greater or smaller than the pre-determined voltage threshold.

The first and the second power switches may comprise (or may be) metaloxide semiconductor transistors (MOS), e.g. MOS field effect transistors.

According to a further aspect, a light bulb assembly is described. The light bulb assembly comprises an electrical connection module configured to electrically connect to a line voltage power supply, thereby providing an input voltage. Furthermore, the light bulb assembly comprises a driver circuit as described in the present document, configured to convert the input voltage into a drive signal for a solid state lighting (SSL) device. In addition, the light bulb assembly comprises the SSL device configured to provide light in accordance to the drive signal.

According to another aspect, a method for operating a controller and/or a driver circuit as outlined in the present document is described. The method may comprise steps which correspond to the features of the controller and/or driver circuit described in the present document. In particular, the method may be directed at controlling a power converter to convert electrical power at an input voltage into electrical power at an output voltage. As outlined above, the power converter comprises a first switcher stage comprising a primary winding of a transformer which is arranged in series with a first power switch. The first switcher stage is arranged in parallel to the input voltage at an input of the power converter. In addition, the power converter comprises a second switcher stage comprising an auxiliary winding of the transformer which is arranged in series with a second power switch. The second switcher stage is arranged in parallel to a reservoir capacitor. Furthermore, the power converter comprises a secondary winding of the transformer which is arranged in parallel to the output voltage at an output of the power converter.

The method comprises determining whether the input voltage is greater or smaller than a pre-determined voltage threshold. In addition, the method comprises operating the first switcher stage to transfer electrical power from the input of the power converter to the output of the power converter, during a first time period when the input voltage is greater than the pre-determined voltage threshold. Furthermore, the method comprises operating the second switcher stage to transfer electrical power from the reservoir capacitor to the output of the power converter, during a second time period when the input voltage is smaller than the pre-determined voltage threshold.

According to a further aspect, a software program is described. The software program may be adapted for execution on a processor and for performing the method steps outlined in the present document when carried out on the processor.

is According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In the present document, this electricity supply is referred to as line voltage, whilst in British English, this supply is typically referred to as "mains". Other terms include AC power, line power, domestic power and grid power. It is to be understood that these terms are readily interchangeable, and carry the same meaning.

Typically, in Europe electricity is supplied at 230-240 VAC, at 50 Hz and in North America at 110-120 VAC at 60 Hz. The principles set out in the present document apply to any suitable electricity supply, including the line voltage/mains mentioned, and a rectified AC power supply.

Figure 1:
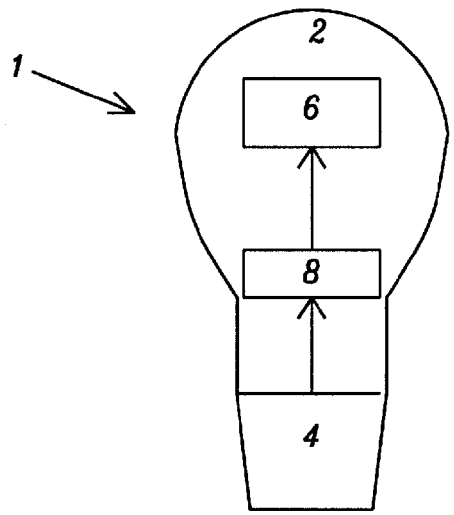
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as a SSL device) is provided within the housing 2. Examples for such light sources 6 are a solid state light source 6, such as a light emitting diode (LED) or an organic light emitting diode (OLED). The light source 6 may be provided by a single light emitting device, or by a plurality of LEDs. Typical SSL devices 6 comprise a plurality of LEDs arranged in series, such that the on-voltage $V_{on}$ of the SSL device results from the sum of on-voltages of the individual LEDs. Typical values for on-voltages of SSL devices are in the range of 100V-150V.

Usually, the voltage drop across an SSL device 6 remains substantially constant (at the on-voltage $V_{on}$ of the SSL device 6), regardless of the intensity of the light emitted by the SSL device 6. The intensity of the light emitted by the SSL device 6 is typically controlled by the drive current through the SSL device 6.

Driver circuit 8 is located within the bulb housing 2, and serves to convert supply electricity (i.e. the line voltage supply) received through the electrical connection module 4 into a controlled drive voltage and drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

Figure 2A:
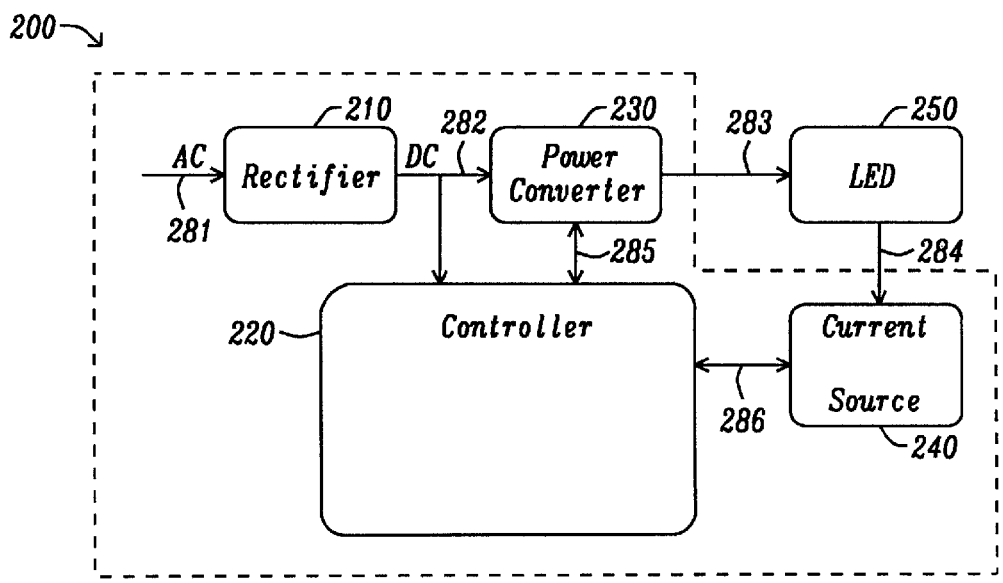
FIG. 2a shows a block diagram of example components of a driver circuit for a SSL device.

FIG. 2a illustrates example components of a driver circuit 200 and block 8 of FIG. 1 and of an SSL device 250 and block 6 of FIG. 1. The driver circuit 200 comprises a rectifier 210 which receives alternating current (AC) 281 supply electricity from the line voltage supply, and delivers a rectified current 282 (DC) at its output. This DC power is received by a power converter 230 which serves to output a controlled DC drive voltage 283 to the SSL device 250. Furthermore, the driver circuit 200 comprises a current source 240 which is configured to provide a controlled drive current 284 to the SSL device 250. The voltage and current characteristics of the drive signal (comprising the drive voltage and the drive current) are determined by the type and number of LEDs employed in the light source 6 of FIG. 1 (i.e. in the SSL device 250). The power supplied to the SSL device 250 is controlled in dependence upon desired operating conditions of the SSL device 250. In one example, the SSL device 250 includes a plurality of LEDs connected in series, and requires a drive signal having a drive voltage of 50V or more. In general, the drive voltage may be in the range of 10V to over 100V depending on the number of LEDs comprised within the SSL device 250.

The driver circuit 200 may further comprise a controller 220 configured to control the power converter 230 and the current source 240 to generate an appropriate drive signal (i.e. an appropriate drive voltage and an appropriate drive current) as a function of the rectified line voltage. In particular, the controller 220 may be configured to adapt a voltage conversion ratio of the power converter 230 based on the rectified (but varying) voltage provided by the rectifier 210. Furthermore, the controller 220 may be configured to control the current source 240 to provide an appropriate drive current to the SSL device 250, thereby controlling the intensity of the light emitted by the SSL device 250.

The power converter 230 may comprise an inductive energy storage device (e.g. an inductor or a transformer) and a switch device. The switch device may be controlled by the controller 220, and may be provided by a metal oxide semiconductor field effect transistor (MOSFET) device, or other device suitable for switching high voltage (for example, tens of volts). It should be noted, however, that the controller 220 may comprise the switch device itself, thereby directly controlling the provisioning of an appropriate drive voltage for the SSL device 250. The power converter 230 may comprise different circuit topology. For example, the power converter 230 may comprise a buck converter circuit, a boost converter circuit, a buck/boost converter circuit, a SEPIC (single-ended primary-inductor converter) circuit, and/or a flyback converter circuit.

Figure 2B:
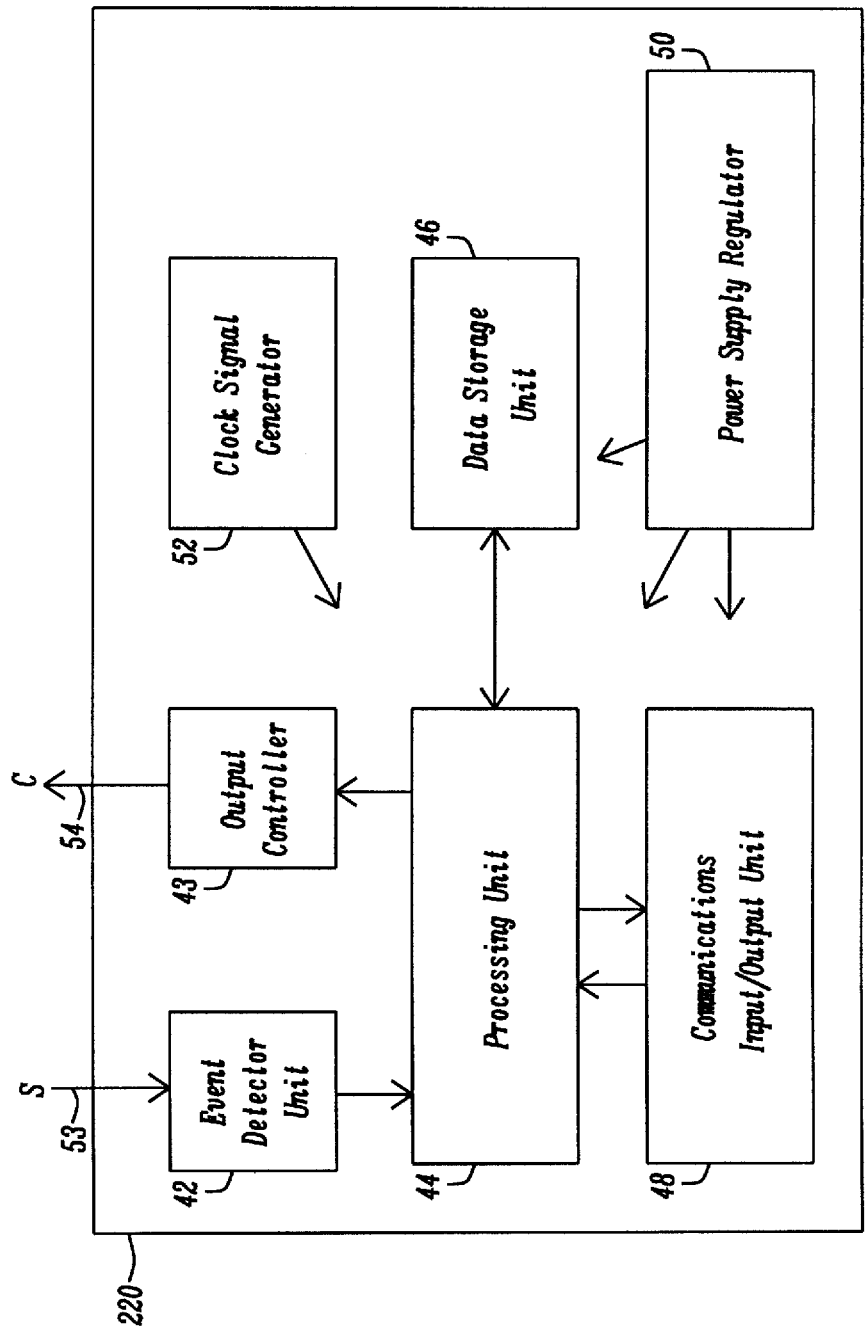
FIG. 2b shows a block diagram of example components of the controller of a driver circuit.

FIG. 2b illustrates an example block diagram of a controller 220 of FIG. 2a. The controller 220 includes an event detector unit 42 connected for receiving sensor/feedback signals S 53 or 202 of FIG. 2a (e.g. for receiving the rectified voltage provided by the rectifier 210 in FIG. 2a), an output controller 43 for outputting control signals C 54 or 285 in FIG. 2a (e.g. to the power converter 230 and/or a signal 286 to the current source 240 of FIG. 2a), a processing unit 44 for overall control of the system, and a data storage unit 46 for storing data for use by the processing device. A communications input/output unit 48 may be provided for enabling the processing unit 44 to communicate with other devices, for example using a suitable wired or wireless communications protocol. The controller 220 also incorporates a power supply regulator 50, which supplies power to the devices within the controller 220, and a clock signal generator 52 (such as an oscillator circuit) for supplying a reference clock signal to the processing unit 44. The clock signal generator 52 may be configured to generate a clock signal from the sensor/feedback signals S 53 (e.g. from the rectified voltage provided by the rectifier 210), thereby enabling a synchronization of the driver circuit 200 with the line voltage frequency. In other words, the clock signal generator 52 may make use of the periodicity of the line voltage cycle, in order to synchronize the driver circuit 200 with the line voltage cycle.

The processing unit 44 operates to generate the control signals C for controlling the switch device or devices in the power converter 230 and/or in the current source 240. Typically, the control signals 54 are pulse-width modulated (PWM) signals that control the duty cycle (that is, the ratio of the length of an 'on-state' of the switch over the length of a complete commutation cycle comprising an on-state phase and a succeeding off-state phase) of the switch device in the power converter 240, and hence to control the output drive voltage 283 of FIG. 2a. In an embodiment, the controller 220 is implemented as a microcontroller or as an integrated circuit.

Figure 3:
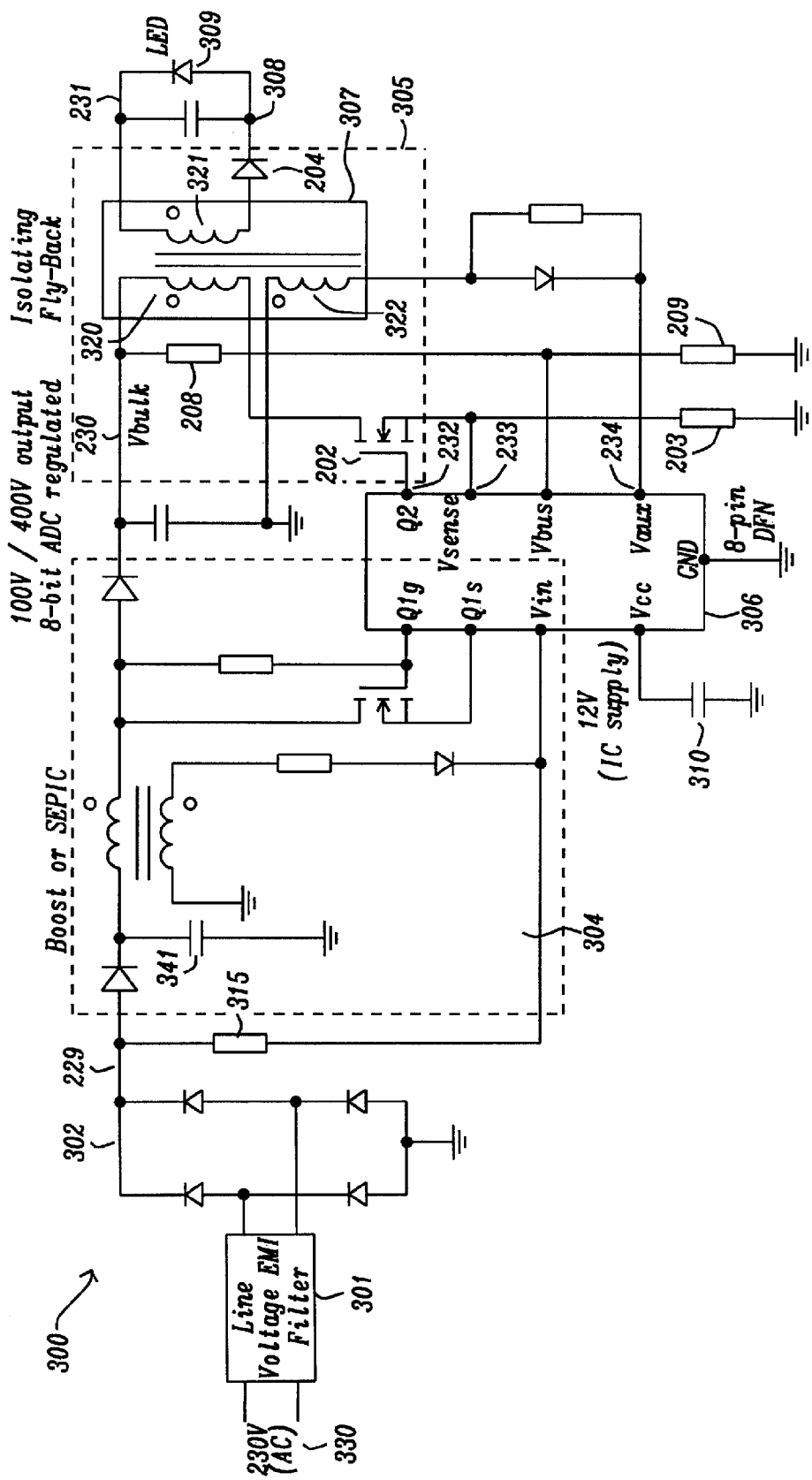
FIG. 3 illustrates a circuit diagram of an example driver circuit for a SSL device.

FIG. 3 shows a circuit diagram of an example driver circuit 300, 200 of FIG. 2a, and 8 of FIG. 1 of a light bulb assembly 1. The driver circuit 300 may be used to provide electrical power to a load 309, 250 of FIG. 2a, and 6 of FIG. 1 (which may e.g. be a light emitting diode, LED, or an LED array). The driver circuit 300 comprises an electromagnetic interference (EMI) filter unit 301 and a rectifier 302, 210 of FIG. 2a, in order to generate a rectified input voltage 229 from the line voltage supply 330.

Furthermore, the driver circuit 300 comprises a controller 306 which is configured to control a power converter 304, 305 of the driver circuit 300. The controller 306 may comprise the controller 220 of FIG. 2a, 2b described above. The controller 306 may be started using a start-up resistor 315. Furthermore, the controller may be coupled to a supply voltage capacitor 310 configured to provide the supply voltage Vcc to the controller 306 (which may be implemented e.g. as an integrated circuit, IC). In the illustrated example, the driver circuit 300 comprises a two-stage power converter with the first stage being a Boost converter 304 and the second stage being a flyback converter 305. The flyback converter 305 comprises a transformer 307 having a primary coil 320 and a secondary coil 321, and having an additional auxiliary coil 322, e.g. for measurement purposes. The auxiliary coil 322 may be used to provide information to the controller 306 regarding the output voltage 231 (also referred to as the drive voltage) of the driver circuit 300. Furthermore, the driver circuit 300 may comprise an output capacitor (or storage capacitor) 308 which stores the electrical power to be provided to the light source 309. The flyback converter 305 comprises a diode 204 which is configured to prevent a reverse energy flow from the output of the flyback converter 305 to the input of the flyback converter 305 during an off-state of the switch 202 of the flyback converter 305.

The first stage of the two-stage power converter is configured to convert the rectified input voltage 229 into a bulk voltage Vbulk 230. The bulk voltage 230 corresponds to the input voltage of the second converter stage 305. The bulk voltage 230 may be sensed using input voltage sensing means 208, 209, thereby providing the sensed voltage signal 234 to the controller 306. In the illustrated example, the input voltage sensing means 208, 209 are implemented using a voltage divider comprising the resistors 208, 209. Furthermore, a sensed current signal 233 is determined using current sensing means 203, and is provided to the controller 306. The sensed current signal 233 is indicative of the current through the power switch 202 of the flyback converter 305. In the illustrated example, the current sensing means are implemented using a shunt resistor 203 which is arranged in series with the power switch 202.

The controller 306 may be configured to determine a gate control signal 232 for putting the switch 202 of the second converter stage 305 into an off-state once the current Is through the switch 202 reaches a pre-determined peak current Ip. For this purpose, the controller 306 may make use of the sensed current signal 233 and/or of the sensed voltage signal 234, in order to compensate variations of the bulk voltage 230 and corresponding variations of the output voltage 231. This may be used to reduce a flickering effect of the load (e.g. light source) 309.

Figure 4:
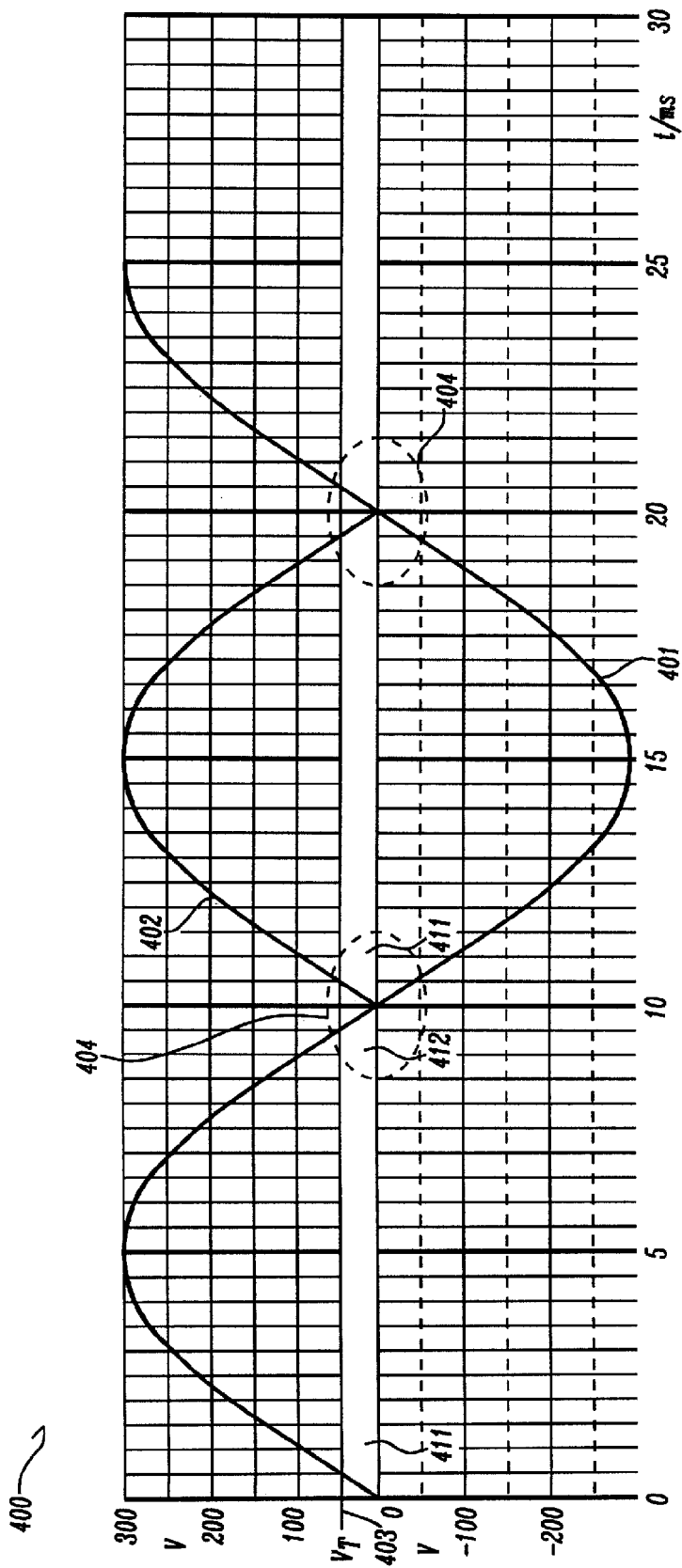
FIG. 4 shows an example line voltage and an example rectified line voltage.

FIG. 4 shows a voltage/time diagram 400 of a cycle of the line voltage provided by the line voltage supply 330 of FIG. 3. It can be seen that the AC line voltage 401 oscillates in a sinusoidal manner at the cycle rate of 50 Hz. Furthermore, the diagram 400 shows the rectified voltage 402 or 229 of FIG. 3 at the output of the rectifier 302 of FIG. 3 or 210 of FIG. 2a. For illustrative purposes, it is assumed that the SSL device 250 of FIG. 2a or 309 FIG. 3 requires an on-voltage $V_{on}$ of 150V. Thus, the drive voltage 231 of FIG. 3, provided by the driver circuit 300 of FIG. 3 should be at or above the on-voltage $V_{on}$ of 150V, in order to ensure that the SSL device 250 of FIG. 2a or 309 of FIG. 3 emits light. For ease of the following explanation, but without being limited to the example values, it is assumed that the driver circuit 300 of FIG. 3 is configured to provide a maximum step-up voltage ratio of 3 (i.e. the output voltage 231 of FIG. 3 of the driver circuit 300 of FIG. 3 may be up to 3 times higher than the input voltage 229 of FIG. 3).

Under the above mentioned assumptions, it can be seen that in the areas around the zero crossings 404 of the AC line voltage 401, i.e. between the time instants 412 and 411, the rectified voltage 402 falls below 50V (reference numeral 403) such that the driver circuit 300 (providing a maximum step-up voltage ratio of 3) cannot supply the required on-voltage $V_{on}$ of the SSL device 250 of FIG. 2a or 309 of FIG. 3. As a consequence, the SSL device 250 does not generate light, whenever there is a zero crossing 404 of the AC line voltage 401.

As can be seen, the zero crossings 404 occur at a frequency which is twice the line voltage frequency, i.e. at a frequency of 100 Hz in the illustrated example. The latter frequency (i.e. twice the line voltage frequency) is referred to as the cycle frequency, because it refers to the frequency of occurrence of substantially identical (half-wave) cycles of the rectified line voltage. Hence, the light generated by the SSL device 250, 309 is interrupted at a cycle frequency of 100 Hz, thereby generating a visible flicker at 100 Hz.

One approach to overcoming the 100 Hz flicker issue could be to make use of a relatively large smoothening capacitor 341 of FIG. 3 at the output of the rectifier 210 of FIG. 2a, 302 of FIG. 3. Such a smoothening capacitor 341 of FIG. 3 smoothens the rectified voltage waveform 402 or 229 of FIG. 3, thereby removing the voltage dips 404 of the rectified voltage waveform 402. A smoothening capacitor (and in particular a large size smoothening capacitor) is however disadvantageous with regards to the integration of the driver circuit 300 (as such a smoothening capacitor is typically mounted externally to an integrated circuit comprising the driver circuit 300). Furthermore, such a smoothening capacitor has a relatively short life time, thereby reducing the life time of the driver circuit 300 and of the complete light bulb assembly 1. This is particularly the case because the smoothening capacitor 341 is connected to the rectified line voltage 402, 229, therefore requiring the use of a high-voltage electrolytic capacitor, which typically exhibits relatively short life times.

Figure 5:
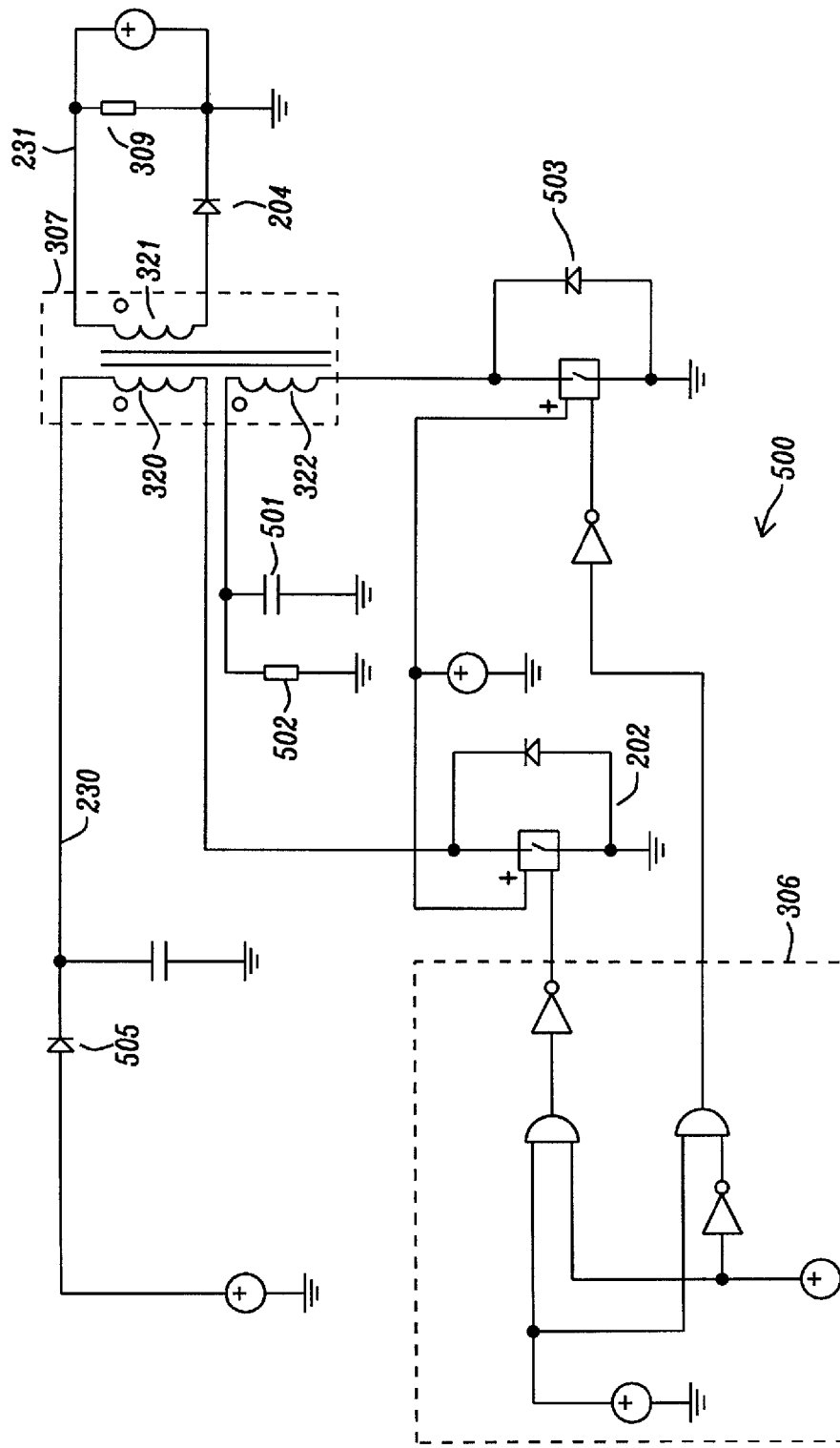
FIG. 5 shows an excerpt of an example driver circuit for driving a SSL device.

FIG. 5 shows a circuit diagram of selected components of a driver circuit 500. The illustrated components form a flyback power converter, e.g. the flyback power converter of the driver circuit 300 of FIG. 3. The illustrated power converter is configured to convert electrical power at an input voltage 230 (e.g. the bulk voltage 230 of the driver circuit 300 of FIG. 3) into the output voltage or drive voltage 231 for the load 309. The transformer 307 of the flyback converter comprises a primary winding 320 and a secondary winding 321. When the power switch 202 (also referred to as the first power switch) of the flyback converter (also referred to as the first flyback converter) is closed, the current through the primary winding 320 increases and induces a magnetic flux which leads to energy to be stored within the transformer 307. During this period, the diode 204 is typically reversed biased and blocks a current through the secondary winding 321. In this period, the electrical energy stored within the output capacitor 308 (not shown in FIG. 5) is provided to the load 309. When the power switch 202 is opened, the stored energy is released and provide to the output of the flyback converter.

The transformer 307 further comprises an auxiliary winding 322. The magnetic flux generated by the current through the primary winding 320 induces a current within the auxiliary winding 322 which may be used to charge an auxiliary capacitor 501 (also referred to as a reservoir capacitor) which is coupled to the auxiliary winding 322. An auxiliary resistor 502 (which may be arranged in parallel to the auxiliary capacitor 501) may be used to prevent current peaks. The auxiliary winding 322 is further coupled to a second power switch 503. The second power switch 503 may comprise a bulk diode, wherein the bulk diode is forward-biased during the period when the first power switch 202 is closed, thereby enabling a current through the auxiliary winding 322 for charging the auxiliary capacitor 501.

FIG. 5 further illustrates excerpts of the controller 306. The controller 306 may be configured to determine the level of the input voltage 230, e.g. using the voltage sensing means 208, 209 shown in FIG. 3. Furthermore, the controller 306 may be configured to operate the first flyback converter (e.g. corresponding to the flyback converter 305 of FIG. 3) using the first power switch 202, if the input voltage 230 is greater or equal to a pre-determined voltage threshold 403 of FIG. 4. In other words, as long as the input voltage 230 is sufficiently high to provide a drive voltage 231 which is equal to or greater than the on-voltage of the SSL device 309, the controller 306 may operate the first flyback converter in a conventional way by controlling the commutation cycle rate and/or the duty cycle of the first power switch 202.

On the other hand, if the input voltage 230 falls below the pre-determined voltage threshold 403, the controller 306 may be configured to operate a flyback converter comprising the second power switch 503, and using the energy stored within the auxiliary capacitor 501 to provide the drive voltage 231 to the SSL device 309. In other words, between the time instants 412 and 411, when the input voltage 230, 402 falls below the pre-determined voltage threshold 403, the second power switch 503 may replace the first power switch 202 within the flyback converter. Furthermore, the energy stored within the auxiliary capacitor 501 replaces the energy provided by the line voltage supply 330. In other words, between the time instants 412 and 411 (referred to as a second time period), a second switcher stage comprising the second power switch 503 and the reservoir capacitor 501 may replace a first switcher stage comprising the first power switch 202, to form a second flyback converter.

Hence, it is proposed in the present document to use a second switcher stage within a power converter. The reservoir or auxiliary capacitor 501 for this second switcher stage is charged up during the peak of the line voltage cycle, i.e. when the input voltage 230 is at or above the pre-determined voltage threshold 403 (i.e. during a first time period). The second switcher stage operates during the zero crossing regions 404 of the line voltage cycle (i.e. during the second time periods) to provide an energy source (in form of the auxiliary capacitor 501) when the line voltage or input voltage 203 is not high enough to do so.

By using a second switcher stage, the turns ratio of the transformer 307 may be used to reduce the voltage drop at the reservoir or auxiliary capacitor 501. In other words, the turns ratio of the primary winding 320 and of the auxiliary winding 322 may be selected such that the level of the voltage at the auxiliary capacitor 501 is reduced compared to the level of the voltage of a smoothing capacitor 341 (which is operated at the level of the input voltage 230). As a result of this, the life time of the capacitor 501 may be increased, and the cost of the capacitor 501 may be reduced.

Hence, by using a second switcher stage, the stored energy in the auxiliary capacitor 501 can be used to drive the output of the power converter, when the input to the first switcher stage has dropped too low. When the first switcher stage is operating, the auxiliary capacitor 501 is charged via the bulk diode conduction of the second switcher device 503 (i.e. of the second power switch 503).

By using an additional switcher stage for the time interval 404 (i.e. for the second time period), when the input voltage 230, 402 is below the pre-determined voltage threshold 403, the overall ripple and total harmonic distortion (THD) of the drive voltage 231 may be reduced. This may be achieved by an appropriate control of the first and second power switches 202, 503. Furthermore, the control of the first and second power switches 202, 503 may be used for improving the power factor of the power converter.

FIG. 5 further shows the use of a diode 505 between the first flyback converter and the line voltage supply, i.e. between the first switcher stage and the line voltage supply. The diode 505 may be used to decouple the first switcher stage from the line voltage supply, when the second switcher stage is active, i.e. when the electrical energy is drawn from the auxiliary capacitor 501. By doing this, an energy flow back towards the line voltage supply may be prevented.

In an example implementation, the VCC capacitor 310 may be used as an auxiliary capacitor 501. In other words, the energy which is stored in the supply voltage capacitor 310 may be used for operating the second switcher stage, and for transferring power towards the output of the power converter. This has the advantage that the first switcher stage supplies the device power, which is typically done with an auxiliary winding on the flyback transformer 307. A flyback converter typically comprises an auxiliary winding, which may be used for measurements and for supplying the VCC charge of the integrated circuit, i.e. of the controller 306, using a relatively large supply voltage capacitor 310. If this is the case, the stored energy may be used for powering the rest of the system. The supply voltage VCC can operate via a larger range. The benefit is that the switches which are used for this can be integrated and no additional high voltage switch is required.

Furthermore, this is beneficial, because the energy source of the second switcher stage may be implemented without the need for an additional capacitor. Hence, the second switcher stage may be implemented using only an additional power switch 503.

In order to use the auxiliary winding 322 for supplying power to the controller 306 and as part of a second switcher stage, the switching may be performed using an internal power switch 503, for example a HV (high voltage) MOS of the controller 306. As the VCC supply capacitor 310 is used as the storage device for the power transfer, the capacitance of the supply voltage capacitor 310 may need to be increased, in order to ensure that the power transfer towards the output of the power converter can be accomplished whilst still maintaining an adequate VCC voltage for the controller 306. By way of example, the VCC capacitor 306 may be in a range of 47 μF and the voltage drop at the capacitor 306 may be 5V. However, as the VCC voltage at the capacitor 306 is lower than the rectified line voltage, the capacitor 306 is more cost effective and reliable (compared with a 450V electrolytic smoothing capacitor 341 used at the rectified line voltage 229).

Figure 6:
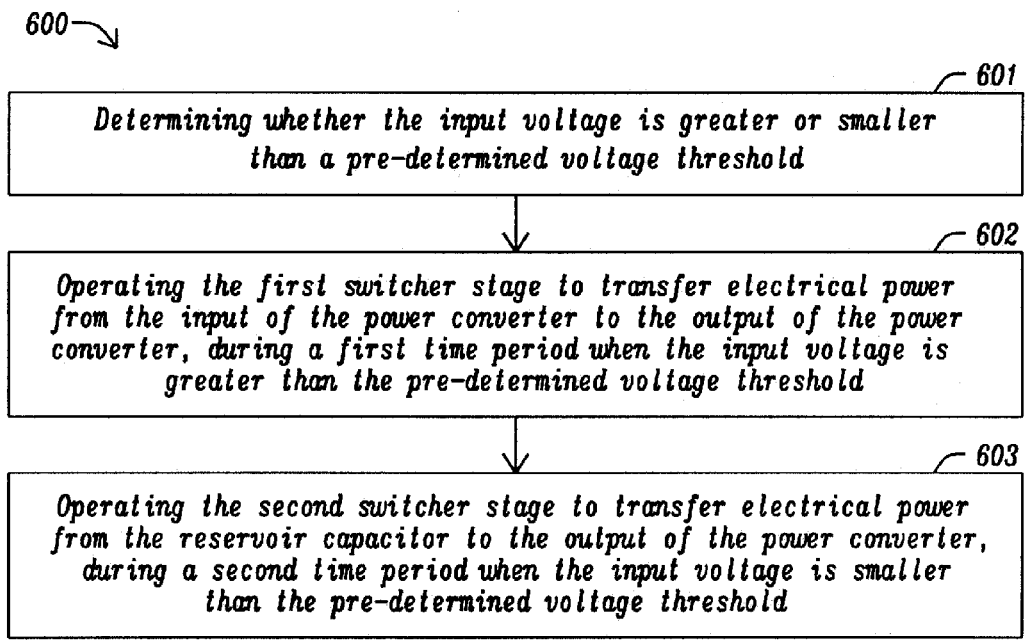
FIG. 6 shows a flow chart of an example method for driving a SSL device.

FIG. 6 shows a flow chart of an example method 600 for controlling a power converter or a driver circuit 500 to convert electrical power at an input voltage 230 into electrical power at an output voltage 231. As outlined above, the power converter comprises a first switcher stage comprising a primary winding 320 of a transformer 307 which is arranged in series with a first power switch 202. The first switcher stage is typically arranged in parallel to the input voltage 230 at an input of the power converter. Furthermore, the power converter comprises a second switcher stage comprising an auxiliary winding 322 of the transformer 307 which is arranged in series with a second power switch 503. The second switcher stage is typically arranged in parallel to a reservoir capacitor 501. In addition, the power converter comprises a secondary winding 321 of the transformer 307 which is typically arranged in parallel to the output voltage 231 at an output of the power converter.

The method 600 comprises determining 601 whether the input voltage 230 is greater or smaller than a pre-determined voltage threshold 403. In addition, the method 600 comprises operating 602 the first switcher stage to transfer electrical power from the input of the power converter to the output of the power converter, during a first time period (between time instant 411 and subsequent time instant 412) when the input voltage 230 is greater than the pre-determined voltage threshold 403. Furthermore, the method 600 comprises operating 603 the second switcher stage to transfer electrical power from the reservoir capacitor 501 to the output of the power converter, during a second time period (between time instant 412 and subsequent time instant 411) when the input voltage 230 is smaller than the pre-determined voltage threshold 403.

A further possibility is to provide a second auxiliary winding, e.g. within the integrated circuit. The second auxiliary winding may be used as a fly back.

The sequencer may be implemented so that one takes a pulse from power and the next from the condenser. The sum of the two currents should be constant. The transformer 307 may comprise two auxiliary windings 322. A first auxiliary winding may be used for charging the auxiliary capacitor 501. A second auxiliary winding may be used for providing a bleeder function. A load of the transformer 307 is typically transparent to the windings of the transformer 307.

The use of a plurality of switcher stages may be beneficial for multi-dimming applications. The phase dimmer may be loaded to the lamp at a given time, while the auxiliary capacitor 322 recharges. In particular, phases with phase-cut input voltage may be bridged by the auxiliary capacitor 322. Such phases may be due to a phase-cut dimmer prior to firing or to the phase-cut of a DLT dimmer.

In the present document, a driver circuit for an SSL device has been described, which allows a flickering effect of the SSL device to be reduced or to be prevented. The described driver circuit makes use of a power converter comprising an additional switcher stage for providing electrical energy during periods, when the input voltage to a first switcher stage of the power converter falls below a pre-determined voltage threshold. The additional switcher stage makes use of a reservoir capacitor which may be operated a relatively low voltage levels, thereby allowing the use of cost effective capacitors with relatively high life times.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller for controlling a power converter to convert electrical power at an input voltage into electrical power at an output voltage; wherein
   the power converter comprises
      a first switcher stage comprising a primary winding of a transformer which is arranged in series with a first power switch; wherein the first switcher stage is arranged in parallel to the input voltage at an input of the power converter;

a second switcher stage comprising an auxiliary winding of the transformer which is arranged in series with a second power switch;

wherein the second switcher stage is arranged in parallel to a reservoir capacitor; and a secondary winding of the transformer which is arranged in parallel to the output voltage at an output of the power converter;

the controller is configured to determine whether the input voltage is greater or smaller than a pre-determined voltage threshold;

operate the first switcher stage to transfer electrical power from the input of the power converter to the output of the power converter, during a first time period when the input voltage is greater than the pre-determined voltage threshold; and operate the second switcher stage to transfer electrical power from the reservoir capacitor to the output of the power converter, during a second time period when the input voltage is smaller than the pre-determined voltage threshold.

2. The controller of claim 1, wherein the controller is configured to operate the first and second switcher stages such that during the first time period electrical power is transferred from the input of the power converter to the reservoir capacitor.

3. The controller of claim 1, wherein the controller is configured to operate the first and second switcher stages such that a variation of the output voltage is lower than a variation of the input voltage.

4. The controller of claim 1, wherein the controller is configured to commutate the first power switch between an on-state and an off-state during the first time period; and commutate the second power switch between an on-state and an off-state during the second time period.

5. The controller of claim 1, wherein the controller is configured to maintain the first power switch in off-state during the second time period; and maintain the second power switch in off-state during the first time period.

6. A driver circuit configured to convert electrical power at an input voltage into electrical power at an output voltage; wherein the driver circuit comprises a first switcher stage comprising a primary winding of a transformer which is arranged in series with a first power switch; wherein the first switcher stage is arranged in parallel to the input voltage at an input of the driver circuit;

a second switcher stage comprising an auxiliary winding of the transformer which is arranged in series with a second power switch;

wherein the second switcher stage is arranged in parallel to a reservoir capacitor;

a secondary winding of the transformer which is arranged in parallel to the output voltage at an output of the driver circuit; and controller configured to determine whether the input voltage is greater or smaller than a predetermined voltage threshold;

operate the first switcher stage to transfer electrical power from the input of the driver circuit to the output of the driver circuit, during a first time period when the input voltage is greater than the predetermined voltage threshold; and operate the second switcher staqe to transfer electrical power from the reservoir capacitor to the output of the driver circuit, during a second time period when the input voltage is smaller than the predetermined voltage threshold.

7. The driver circuit of claim 6, wherein the reservoir capacitor is coupled to a supply voltage pin of the controller for supplying the controller with electrical power.

8. The driver circuit of claim 6, wherein the input voltage is derived from an AC line voltage.

9. The driver circuit of claim 6, further comprising decoupling means configured to decouple the first switcher stage from the input of the driver circuit during the second time period.

10. The driver circuit of claim 6, further comprising voltage sensing means configured to provide an indication of the input voltage to a voltage sensing pin of the controller.

11. The driver circuit of claim 6, wherein the first and the second power switches comprise metaloxide semiconductor transistors.

12. The driver circuit of claim 6, wherein the driver circuit is configured to convert a varying input voltage into a substantially constant output voltage for a solid state lighting, referred to as SSL, device; and the substantially constant output voltage corresponds to an on-voltage of the SSL device.

13. A light bulb assembly comprising an electrical connection module configured to electrically connect to a line voltage power supply, thereby providing an input voltage;

a driver circuit of claim 6, configured to convert the input voltage into a drive signal for a solid state lighting, referred to as SSL, device; and the SSL device configured to provide light in accordance to the drive signal.

14. A method controlling a power converter to convert electrical power at an input voltage into electrical power at an output voltage; wherein the power converter comprises a first switcher stage comprising a primary winding of a transformer which is arranged in series with a first power switch; wherein the first switcher stage is in parallel to the input voltage at an input of the power converter; a second switcher stage comprising an auxiliary winding of the transformer which is in series with a second power switch; wherein the second switcher stage is in parallel to a reservoir capacitor; and a secondary winding of the transformer which is in parallel to the output voltage at an output of the power converter; wherein the method comprises determining whether the input voltage is greater or smaller than a pre-determined voltage threshold;

operating the first switcher stage to transfer electrical power from the input of the power converter to the output of the power converter, during a first time period when the input voltage is greater than the pre-determined voltage threshold; and operating the second switcher stage to transfer electrical power from the reservoir capacitor to the output of the power converter, during a second time period when the input voltage is smaller than the pre-determined voltage threshold.

15. The method for controlling a power converter of claim 14, wherein the controller operates the first and second switcher stages such that during the first time period electrical power is transferred from the input of the power converter to the reservoir capacitor.

16. The method for controlling a power converter of claim 14, wherein the controller operates the first and second switcher stages such that a variation of the output voltage is lower than a variation of the input voltage.

17. The method for controlling a power converter of claim 14, wherein the controller:
- commutates the first power switch between an on-state and an off-state during the first time period; and
- commutates the second power switch between an on-state and an off-state during the second time period.

18. The method for controlling a power converter of claim 14, wherein the controller:
- maintains the first power switch in off-state during the second time period; and
- maintains the second power switch in off-state during the first time period.

* * * * *